United States Patent [19]

Suga

[11] Patent Number: 5,653,085

[45] Date of Patent: Aug. 5, 1997

[54] SEALING DEVICE FOR PACKAGING MACHINE

[75] Inventor: Yasutaka Suga, Ibaraki, Japan

[73] Assignee: Ibaraki Seiki Machinery Company, Ltd., Osaka-fu, Japan

[21] Appl. No.: 650,335

[22] Filed: May 20, 1996

[51] Int. Cl.[6] .............................. B65B 9/20; B65B 51/30; B65B 57/00
[52] U.S. Cl. .................. 53/75; 53/550; 53/374.5
[58] Field of Search ............... 53/450, 451, 75, 53/550, 551, 552, 374.5

[56] References Cited

U.S. PATENT DOCUMENTS

| | | | |
|---|---|---|---|
| 3,438,173 | 4/1969 | Omori | 53/39 |
| 4,525,977 | 7/1985 | Matt | 53/550 X |
| 4,704,843 | 11/1987 | Owen et al. | 53/450 |
| 4,722,168 | 2/1988 | Heaney | 53/75 X |
| 4,872,302 | 10/1989 | Van Eijsden et al. | 53/550 X |
| 5,269,119 | 12/1993 | Tolson | 53/550 X |
| 5,271,210 | 12/1993 | Tolson | 53/550 |
| 5,285,621 | 2/1994 | Ballestrazzi et al. | 53/556 |
| 5,329,745 | 7/1994 | Suga | 53/75 |
| 5,337,542 | 8/1994 | Omori | 53/550 |
| 5,347,791 | 9/1994 | Ginzl et al. | 53/450 |
| 5,367,859 | 11/1994 | Suga | 53/550 |
| 5,421,139 | 6/1995 | Tolson | 53/550 X |
| 5,473,867 | 12/1995 | Suga | 53/550 X |

*Primary Examiner*—Horace M. Culver
*Attorney, Agent, or Firm*—Barnes, Kisselle, Raisch, Choate, Whittemore & Hulbert, P.C.

[57] ABSTRACT

The present invention is intended to effect proper sealing of a film by automatically adjusting the gripping pressure exerted by seal bars on the basis of a change in unsteady current flowing through the seal bars which grip the film. When the main shaft of a servomotor mounted on a frame is rotated forward and backward, the pair of seal bars opens and closes. When the seal bars press each other, the film is gripped under pressure by these seal bars and heat-sealed. Cushion means for elastically pressing the seal bars increases the gripping pressure of the pair of seal bars in proportion to an increase in the angle of rotation of the motor main shaft after the opposed surfaces of the seal bars have contacted each other. A controller decreases the sealer gripping pressure when the current is high and produces a large amount of heat in filaments stuck to the opposed surfaces of the seal bars but increases the sealer gripping pressure when the current is low and produces a smaller amount of heat in the filaments.

6 Claims, 3 Drawing Sheets

SEALING DEVICE FOR PACKAGING MACHINE

FIELD OF THE INVENTION

The present invention relates to a device used in a bag making and filling type packaging machine, which is adapted to operate in box motion in the same direction as a tube film which covers articles to be packaged, so as to crossseal said tube film to isolate said articles from each other.

BACKGROUND OF THE INVENTION

A device including a pair of seal bars which operate in box motion to grip and heat-seal a tube film covering a number of articles horizontally moving at equal intervals is disclosed in U.S. Pat. No. 5,367,859 and U.S. Pat. No. 5,271,210. As shown in these known examples, the gripping pressure with which the pair of seal bars grip a thermoplastic film is obtained from a mechanical element referred to as a rotation type motor.

To heat-seal a thermoplastic film in a satisfactory manner, the time during which the pair of seal bars grip the film, the calorific power for heating the film, and the gripping pressure on the film have to be properly coordinated. However, as considered from the standpoint of efficiency, the time during which the seal bars grip the film has to be almost an instant and hence the calorific power to heat the film has to be correspondingly set at a higher value.

Further, as can be seen from the above-mentioned known examples, the gripping pressure of the seal bars using a motor as a drive source is constant so long as the operator adds no adjustment thereto. Thus, if the calorific power for the film changes to a lower value, signs of incomplete heat-seal appear in the film, while, reversely, if it changes to a higher value, a keloid phenomenon appears in the heat-sealed portions.

The heat with which to heat-seal the film is obtained either by constantly feeding electric current to a pipe heater embedded in the seal bar to heat the seal bar itself or by applying impulse current to a heat generating filament stuck to the seal bar. However, the heat to heat-seal said film is unstable all the time owing to changes in electric current.

That is, said current is unstable owing to changes in the resistance of heat generating filaments or Nichrome wires. And said current is also unstable immediately after the start of operation of the packaging machine. As a result, the aforesaid incomplete heat-seal or keloid phenomenon appears in the sealed portions of the film.

Summary of the Invention

An object of the present invention is to effect proper sealing of a film by automatically adjusting the gripping pressure on the film on the basis of a change in unsteady current. To achieve such object, the invention provides a sealing device for a packaging machine wherein a strip film is delivered around articles being transferred to be packaged as they are horizontally arranged at equal intervals, said film being curled by tube making means to peripherally cover said articles while a frame supporting a pair of seal bars is reciprocated in the same direction as said articles to heat-seal said tube film, said sealing device comprising means for transmitting the rotational movement of the main shaft of a servomotor mounted on said frame to said pair of seal bars, the forward and backward rotation of said main shaft being effective to open and close said pair of seal bars, cushion means for elastically pressing the seal bars against each other after said seal bars have closed with their opposed surfaces coming into contact, means for detecting by a current detector an impulse current to be applied to heat generating filaments stuck to the opposed surfaces of said seal bars, and transmitting the current value thereof to the controller, a rotational angle detector for feeding back the amount of rotational movement of the main shaft of the servomotor as a feedback pulse to said controller, arithmetic means for finding the gripping pressure exerted by the seal bars and corresponding to calorific power of said heat generating filaments from the collation between the feedback signal from said rotational angle detector and the transmitted signal from said current detector, and control means for transmitting an instruction signal to said servomotor on the basis of the result found by said arithmetic means in order to determine the amount of rotation of said servomotor main shaft.

In another aspect, the invention provides a sealing device for a packaging machine wherein a strip film is delivered around articles being transferred to be packaged as they are horizontally arranged at equal intervals, said film being curled by tube making means to peripherally cover said articles while a frame supporting a pair of seal bars is reciprocated in the same direction as said articles to heat-seal said tube film, said sealing device comprising means for transmitting the rotational movement of the main shaft of a servomotor mounted on said frame to said pair of seal bars, the forward and backward rotation of said main shaft being effective to open and close said pair of seal bars, cushion means for elastically pressing the seal bars against each other after said seal bars have closed with their opposed surfaces coming into contact, means for detecting by a temperature detector the temperature of heat generated by a pipe heater embedded in said seal bar, and transmitting the temperature value thereof to the controller, a rotational angle detector for feeding back the amount of rotational movement of the main shaft of the servomotor as a feedback pulse to said controller, arithmetic means for finding the gripping pressure exerted by the seal bars and corresponding to calorific power of said pipe heater from the collation between the feedback signal from said rotational angle detector and the transmitted signal from said temperature detector, and control means for transmitting an instruction signal to said servomotor on the basis of the result found by said arithmetic means in order to determine the amount of rotation of said servomotor main shaft.

According to the invention, with the arrangement thus made, when the main shaft of the servomotor is rotated forward and backward, the pair of seal bars supported on the frame are released or closed, and when the seal bars press each other, the film is gripped between them and heat-sealed. In this case, cushion means for elastically pressing the seal bars against each other increases the gripping pressure exerted by the pair of seal bars on the film in proportion to an increase in the angle of rotation of the motor main shaft.

On the one hand, the rotational angle detector connected to the motor main shaft feeds back the angle of rotation of the motor main shaft as a numerical value to the controller, and on the other hand, the current detector detects the current flowing through a filament stuck to the seal bar and transmits the data on current to the controller. The controller then controls the amount of rotation of the motor main shaft corresponding to the calorific power of said filament. That is, the controller decreases the sealer gripping pressure when the current is high to produce a large amount of heat but increases the sealer gripping pressure when the current is low to produce a smaller amount of heat.

Unlike said impulse sealer, in the case where the seal bar is directly heated by a pipe heater, the temperature detector transmits the data on the seal bar temperature to the controller, which then controls the angle of rotation of the motor main shaft which is being fed back from the rotational angle detector, said feedback being effected in coordination with the seal bar temperature.

BRIEF DESCRIPTION OF THE DRAWINGS

FIG. 3 is an enlarged view of seal bars;

DESCRIPTION OF EMBODIMENTS

Figure 1:
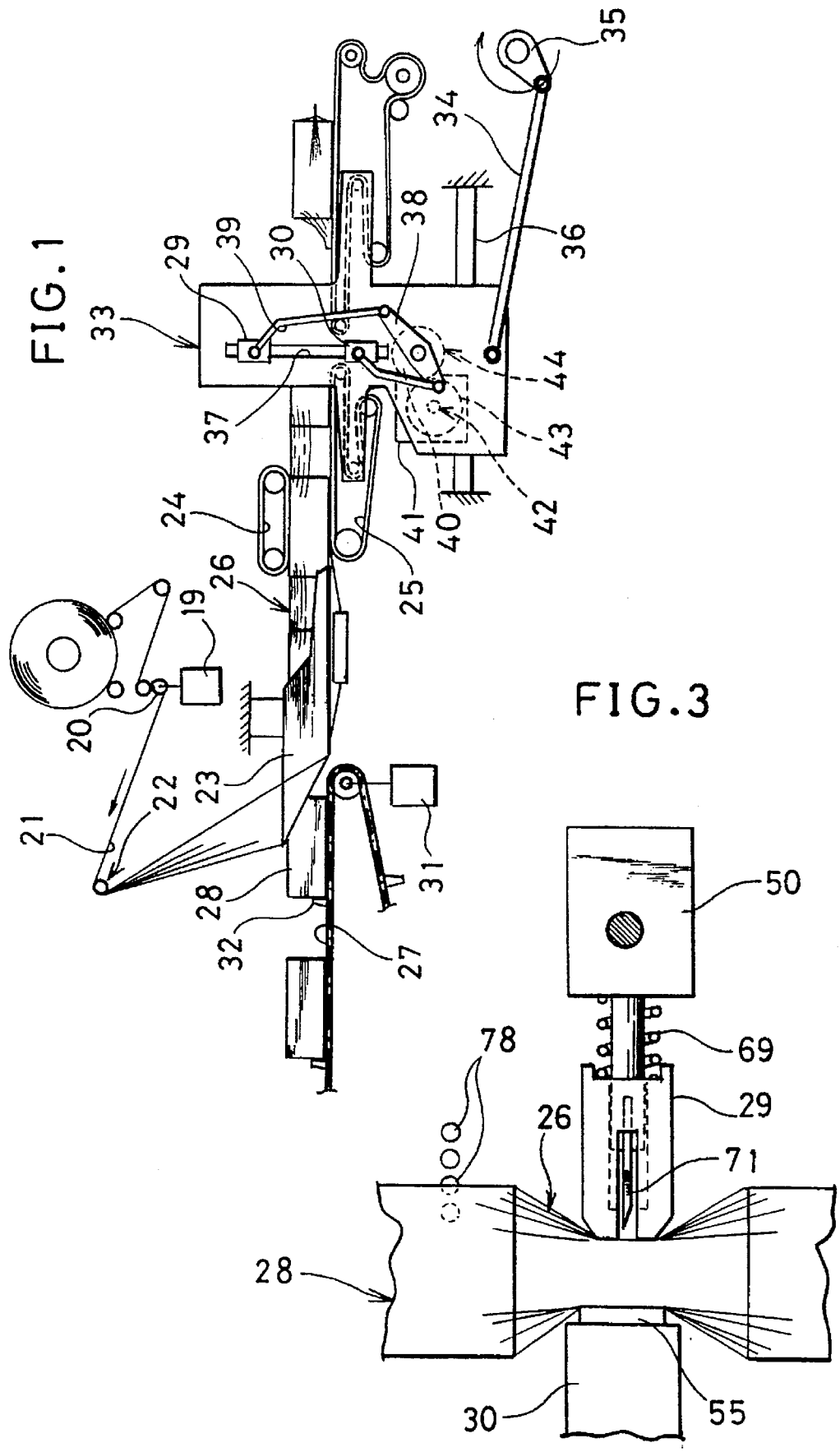
FIG. 1 is a side view of a sealing device for a packaging machine, showing an embodiment of the present invention.

In FIG. 1, a delivery roll 20 rotated by a first motor 19 delivers a strip-like film 21 to tube making means 23 through a dancer roll 22. The film 21 is drawn by a pair of upper and lower belts 24 and 25 through the tube making means 23, whereby it is shaped into a tube form 26.

A feed conveyor 27 rotated by a second motor 31 transfers articles 28 at equal intervals into a tube film 26 by pushing them by attachments 32 installed on said feed conveyor, whereupon the articles 28 covered with the tube film 26 are successively transferred to and received between a pair of upper and lower seal bars 29 and 30 which are located downstream.

A frame 33 which supports said seal bars 29 and 30 is connected to a crank 35 through a connecting rod 34, the rotation of said crank 35 reciprocating said frame 33 at the same speed as the tube film 26 along a guide 36 such that finally the frame 33 assumes its original position, such movement being repetitively effected. The stroke of traverse movement of the frame 33 is equal to the feed pitch of one article 28.

The pair of seal bars 29 and 30 supported in a slit guide 37 in said frame 33 are respectively connected through links 39 and 40 to the opposite ends of a bell crank 38 installed in said frame 33. The forward and backward rotation of the main shaft 42 of a servomotor 41 mounted on the frame 33 is transmitted to the bell crank 38 through gears 43 and 44, thus causing the opening and closing movement of the pair of seal bars 29 and 30.

Figure 2:
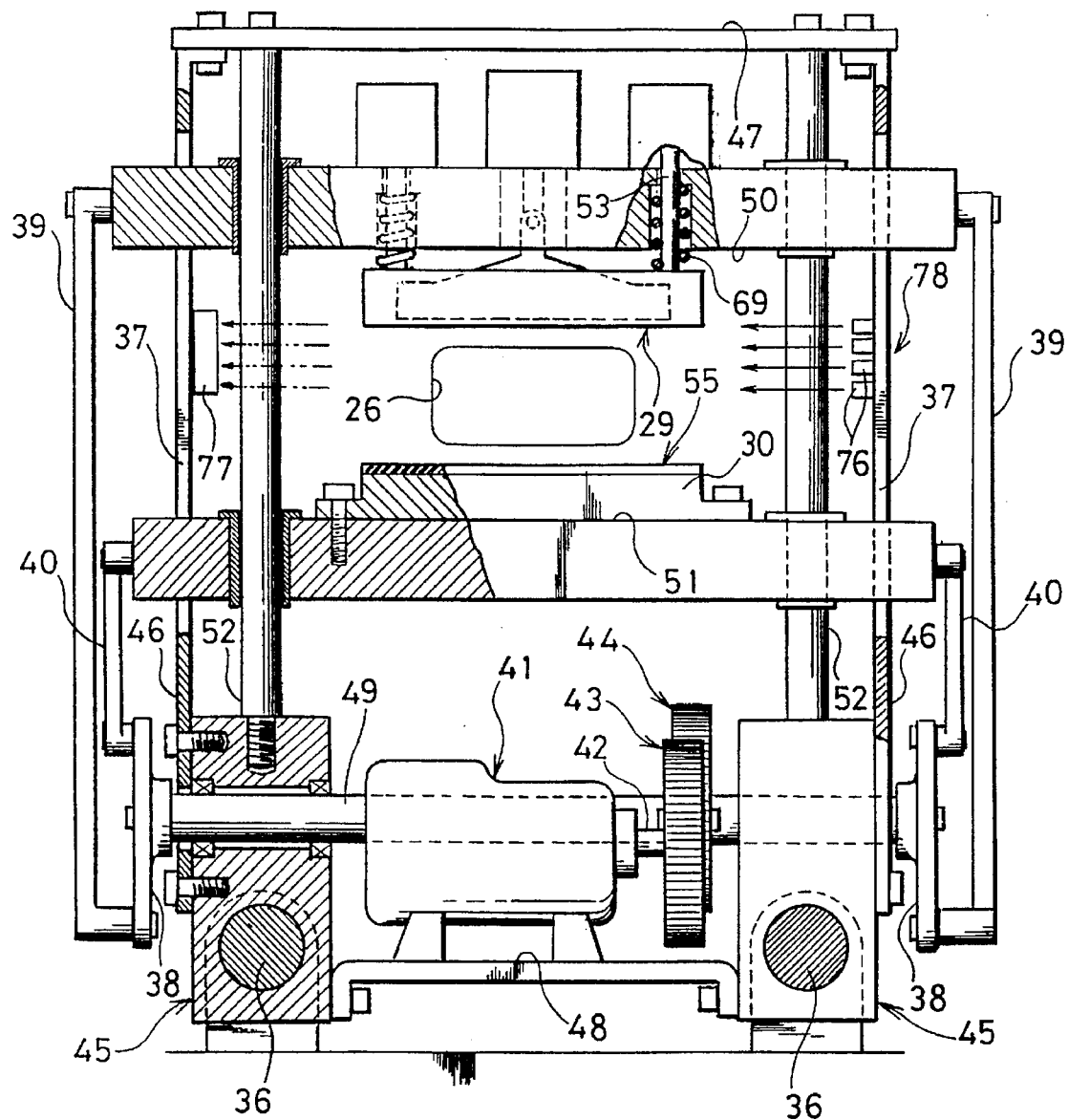
FIG. 2 is a front view of a seal bar support frame.

Referring to FIG. 2 to describe said frame 33 in more detail, the frame 33 comprises a pair of blocks 45 slidably supported on two horizontal guides 38, a pair of side plates 46 fixed to said blocks, and a canopy 47 laid on the upper ends of the side plates, the whole being gate-shaped. The pinion 43 is fixed on the main shaft 42 of the servomotor 41 on a support table 48, and the gear 44 is fixed on a driven shaft 49 rotatably mounted between the blocks 45, the arrangement being such that the rotational power of the servomotor 41 is transmitted from said pinion 43 to the driven shaft 4 through the gear 44.

Engaged in said slits 37 respectively formed in the side plates 48 of the frame are the opposite ends of a pair of support members 50 and 51. These support members 50 and 51 are vertically movable along bar-like guides 52 erected on the blocks 45.

The support members 50 and 51 are connected at their respective ends, through said large and small links 39 and 40, to the opposite ends of said bell crank 38 fixed on the opposite ends of the driven shaft 49. The forward or backward rotation of the main shaft 42 decreases or increases the spacing between the upper and lower support members 50 and 51.

Rods 53 fixed on the upper surface of the upper seal bar 29 disposed below the upper support member 50 are slidably received in the upper support member 50, and compression springs 69 provide buffering force against the force which pushes up the seal bar 29 from below.

Further, the lower seal bar 30 fixed on the upper surface of the lower support member 51 functions as a seal table. Silicone rubber 55 mounted on the upper surface thereof produces a buffer function against the downward pushing force from the seal bar 29. The tube film 26 is gripped by these seal bars 29 and 30.

Figure 4:
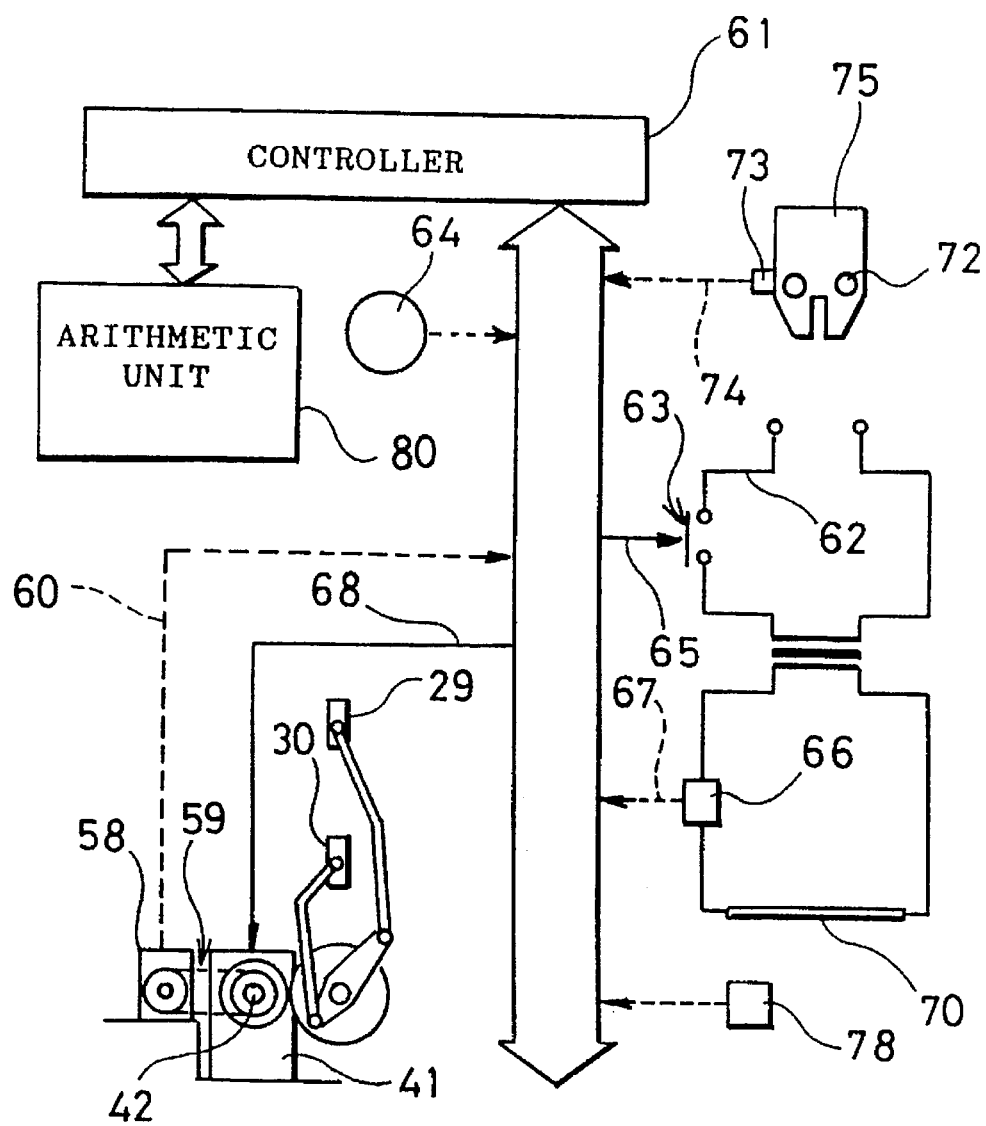
FIG. 4 is an explanatory view of control circuit.

As shown in FIG. 4, an encoder 58 for detecting the angle of rotation of the main shaft 42 of the servomotor is connected to the servomotor 41 through a chain 59. It is preferable, however, that said rotational angle detector 58 be contained in the servomotor 41. This rotational angle detector 58 converts the amount of movement, in forward and backward directions, of the main shaft 42 into feedback pulses which are fed into a controller 61 through a feedback circuit 60. That is, the controller 61 is constantly gathering information on the relative spacing between the pair of seal bars 29 and 30.

A normal open switch 63 placed in a power circuit 62 for a heat generating filament 70 receives indication signals through a circuit 65, said signals being controlled by a timer 64, and said switch 83 is closed at given time intervals. Therefore, impulse current flows through the heat generating filament 70 at given time intervals, causing said filament 70 to generate heat each time .

Each time said switch 83 is closed, a current detector 66 installed in said power circuit 62 converts the value of the impulse current flowing through said circuit 62 into an analog signal and feeds the latter into the controller 61 through a transmission circuit 67.

The controller 61 operates such that the timing for the pair of seal bars 29 and 30 to grip the tube film at given intervals coincides with the timing for closing the normal open switch 63. That is, an arithmetic unit 80 calculates the mean value of the current values fed from the current detector 66 and the mean value of the angles of rotation of the main shaft 42 fed back from the rotational angle detector 58 and collates these means values, thus finding a gripping pressure exerted by said seal bars which corresponds to the amount of heat generated by said heat generating filament. The controller 61 determines the angle of rotation of the main shaft 42 by the signal fed to the servomotor 41 on the basis of the result found by the arithmetic unit 80.

As shown in FIG. 3, even if the lower surface of the upper seal bar 29 comes into contact with the silicone rubber 55 placed on the upper surface of the lower seal bar, the main shaft 42 of the servomotor is still rotatable by an amount corresponding to the amount of compression of the silicone rubber and springs 69; thus, the controller 61 adjusts the gripping pressure exerted by the seal bars 29 and 30 on the tube film in accordance with the amount of generated heat in the filament 70 in FIG. 4.

Figure 5:
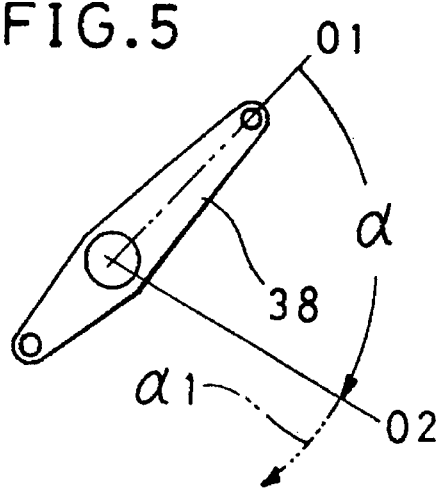
FIG. 5 is a view for explaining the rotation range of a bell crank.

Further, referring to FIG. 5, when the bell crank 38 rotates clockwise from the position 01 to the position 02, the opposed surfaces of the upper and lower seal bars 29 and 30 contact each other. Since the bell crank 38 is capable of further rotating against the resistance of the cushion means, the gripping pressure exerted by the pair of seal bars 29 and 30 on the tube film is adjusted within a range α1. Further, the bell crank 23 which is restored counterclockwise stops on its way at any control position in a range α corresponding to the height of the article.

Two heat generating filaments are stuck to the lower surface of the bifurcated seal bar 29 in FIG. 3. When the upper support member 50 lowers, the tube film is heat-sealed by the heat generating filaments on the opposite sides of the line along which it is cut by a cutter 71.

Further, as shown in FIG. 4, in the type in which embedded pipe heaters 72 constantly heat a seal bar 75, a detector 73 measures the surface temperature of said seal bar 75 and transmits this data to the controller through a signal circuit 74. In this case, the controller 61 collates the temperature measured by the detector 73 with the feedback signal from the encoder 58, thereby determining the angle of rotation of the main shaft 42 of the servomotor. That is, the gripping pressure to be exerted by the seal bars on the tube film is determined in conformity with the temperature of the seal bar.

Further, in FIG. 2, a photocell 76 installed on one side plate cooperates with a photoreceiver 77 to form an image sensor 78.

This image sensor 78, as shown in FIG. 3, is vertically arranged to convert the height of the packaged article in the tube film 26 into a numerical signal and feed the latter into the controller. To this end, the spacing between the upper and lower seal bars does not exceed the height of the packaged article. That is, the controller 61 collates the feedback date from the image sensor 78 in FIG. 4 with the feedback data from the rotational angle detector 58, so as to control the upper and lower seal bars 29 and 30 to prevent themselves from making unnecessary movement. This results in a sufficient time for the main shaft 42 to reverse and causes the mechanical elements to produce less sound.

What is claimed is:

1. A sealing device for a packaging machine wherein a strip film is delivered around articles being transferred to be packaged as they are horizontally arranged at equal intervals, said film being curled by tube making means to peripherally cover said articles while a frame supporting a pair of seal bars is reciprocated in the same direction as said articles to heat-seal said tube film, said sealing device comprising;

means for transmitting the rotational movement of the main shaft of a servomotor mounted on said frame to said pair of seal bars, the forward and backward rotation of said main shaft being effective to open and close said pair of seal bars, cushion means for elastically pressing the seal bars against each other after said seal bars have closed with their opposed surfaces coming into contact, means for detecting by a current detector an impulse current to be applied to heat generating filaments stuck to the opposed surfaces of said seal bars, and transmitting the current value thereof to the controller, a rotational angle detector for feeding back the amount of rotational movement of the main shaft of the servomotor as a feedback pulse to said controller, arithmetic means for finding the gripping pressure exerted by the seal bars and corresponding to calorific power of said heat generating filaments from the collation between the feedback signal from said rotational angle detector and the transmitted signal from said current detector, and control means for transmitting an instruction signal to said servomotor on the basis of the result found by said arithmetic means in order to determine the amount of rotation of said servomotor main shaft.

2. A sealing device for a packaging machine wherein a strip film is delivered around articles being transferred to be packaged as they are horizontally arranged at equal intervals, said film being curled by tube making means to peripherally cover said articles while a frame supporting a pair of seal bars is reciprocated in the same direction as said articles to heat-seal said tube film, said sealing device comprising;

means for transmitting the rotational movement of the main shaft of a servomotor mounted on said frame to said pair of seal bars, the forward and backward rotation of said main shaft being effective to open and close said pair of seal bars, cushion means for elastically pressing the seal bars against each other after said seal bars have closed with their opposed surfaces coming into contact, means for detecting by a temperature detector the temperature of heat generated by a pipe heater embedded in said seal bar, and transmitting the temperature value thereof to the controller, a rotational angle detector for feeding back the amount of rotational movement of the main shaft of the servomotor as a feedback pulse to said controller, arithmetic means for finding the gripping pressure exerted by the seal bars and corresponding to calorific power of said pipe heater from the collation between the feedback signal from said rotational angle detector and the transmitted signal from said temperature detector, and control means for transmitting an instruction signal to said servomotor on the basis of the result found by said arithmetic means in order to determine the amount of rotation of said servomotor main shaft.

3. A sealing device for a packaging machine as set forth in claim 1 or 2, wherein the cushion means for elastically pressing the seal bars against each other is formed by an elastic material stuck to at least one of the opposed surfaces of the pair of seal bars.

4. A sealing device for a packaging machine as set forth in claim 1 or 2, wherein the cushion means for elastically pressing the seal bars against each other is interposed between one seal bar and the member supporting said one seal bar and is formed by springs pushing said one seal bar toward the other seal bar.

5. A sealing device for a packaging machine as set forth in claim 1 or 2, wherein one seal bar is provided with cushion means formed by springs and the other seal bar is provided with cushion means formed by an elastic material.

6. A sealing device for a packaging machine as set forth in claim 1 or 2, including an image sensor disposed between the tube making means and the support frame for detecting the height of a packaged article being transferred in this space interval, the data on the packaged article detected by said image sensor being transmitted to the controller, and means for controlling the amount of rotation of the servomotor main shaft in the direction to open the seal bars on the basis of the collation between this transmitted data and the feedback data from the rotational angle detector.

* * * * *